3,143,558
ARYL SULFONYLTHIONYLAMIDES AND DERIVATIVES THEREOF AND METHODS OF PRODUCING THE SAME
Gunter Kresse, Berlin-Frohnau, and Artur Maschke, Berlin-Charlottenburg, Germany, assignors to Schering AG., Berlin, Germany
No Drawing. Filed Dec. 29, 1960, Ser. No. 79,126
Claims priority, application Germany Jan. 6, 1960
8 Claims. (Cl. 260—397.7)

The present invention relates to aryl sulfonylthionylamides, derivatives thereof and methods of producing the same, and more particularly to methods of producing aryl sulfonylthionylamides and to methods of reacting the aryl sulfonylthionylamides to produce various new derivatives, including adducts thereof with butadienes.

Thionylamines of the formula $$R\text{---}N\text{=}S\text{=}O$$

wherein R is an aromatic or aliphatic radical, are known. The thionylamines, and particularly the aromatic thionylamines, are interesting products, particularly in view of their dienophilic properties. Thus, for example, thionyl aniline and numerous nuclear substituted derivatives thereof reacts with butadiene or 2,3-dimethyl butadiene under 1,4-addition of the ---N=S= bonds to the conjugated system to form dihydro thiazine compounds. However, a long time is required to form these compounds, and it is necessary to carry out the reactions under heating and refluxing.

It is accordingly a primary object of the present invention to provide a new series of compounds, namely aryl sulfonylthionylamides which have many valuable properties, including the property of being dienophilic at room temperature and forming adducts with butadiene and derivatives thereof very rapidly.

It is another object of the present invention to provide a new series of compounds, namely, aryl sulfonylthionylamides.

It is yet another object of the present invention to provide the method of producing the new series of aryl sulfonylthionylamides of the present invention.

It is still another object of the present invention to provide a series of derivatives of the aryl sulfonylthionylamides which are formed by reacting the aryl sulfonylthionylamides with butadiene and derivatives thereof.

As a further object the present invention comprises various reactions of the aryl sulfonylthionylamides produced in accordance with the present invention.

Other objects and advantages of the present invention will be apparent from a further reading of the specification and of the appended claims.

With the above and other objects in view, the present invention mainly comprises a compound of the formula:

$$R\text{---}SO_2\text{---}N\text{=}S\text{=}O$$

wherein R is aryl. Compounds of these types as well as alkyl sulfonylthionylamides are new compounds.

The aryl radical may be unsubstituted or substituted by various substituents such as alkyl, particularly lower alkyl, halogen, nitro radicals, etc. The halogen may be any of the halogens, i.e. chlorine, bromine, iodine or fluorine and the number of substituents in the aryl may vary within all possible limits.

As will be more fully detailed in the discussion to follow the above aryl sulfonylthionyl amides can be reacted with butadiene and deratives thereof to form various different compounds which are new compounds and which are also within the scope of the present invention.

Thus, the present invention also comprises compounds of the formula:

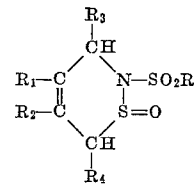

wherein R is aryl, wherein $R_1$ alone is selected from the group consisting of hydrogen, lower alkyl and chlorine, wherein $R_2$ alone is selected from the group consisting of hydrogen, lower alkyl and chlorine, and wherein $R_1$ and $R_2$ together form alkenyl, and wherein $R_3$ and $R_4$ are each selected from the group consisting of hydrogen, lower alkyl, aryl and $COOR_5$ wherein $R_5$ is selected from the group consisting of hydrogen, lower alkyl and aryl.

The above set forth adducts can in addition be oxidized to form compounds of the following general formula:

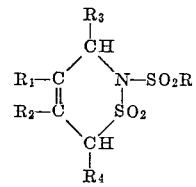

wherein R, $R_1$, $R_2$, $R_3$ and $R_4$ all have the same definitions as above. In addition, the above set forth adducts can be hydrolyzed to form compounds of the following general formula:

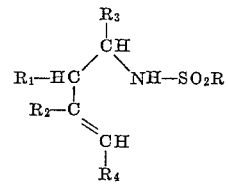

wherein R, $R_1$, $R_2$, $R_3$ and $R_4$ all have the same definitions as above.

It has been found that aryl sulfonylthionylamides can be formed by reacting aryl sulfonamides with a thionylation agent such as thionyl chloride or the like, preferably in the presence of an inert organic liquid such as water-free benzene. The reaction proceeds in accordance with the following equation:

$$R\text{---}SO_2\text{---}NH_2 + SOCl_2 \rightarrow R\text{---}SO_2\text{---}NSO + 2HCl$$

Although the reaction proceeds considerably slower than in the case of the amines, after the several days of heating under refluxing which are necessary in order to complete the reaction, very high yields are obtained.

The resulting sulfonylthionylamides of benzene, p-toluene, and the like, are thermally relatively stable, solid, slightly yellow colored substances which are distillable under high vacuum. The latter property makes it possible to separate the new compounds from any remaining unreacted sulfonamide residue. Their infra-red spectrum shows besides the expected $SO_2$ bands at 1175 and 1374 cm.[-1] two additional strong bands at 1090 and 1243 cm.[-1].

It was completely unpredictable that thionyl chloride would react with sulfonamides in analogous manner as in the case of amines since the $NH_2$--- groups in the two classes of compounds are of opposite character, i.e. acid instead of basic character.

The new group of compounds, namely the aryl sulfonylthionylamides of the present invention is extraordinarily interesting since these compounds are capable of reacting in various ways. They are particularly valuable as intermediate products in the synthesis of technically valuable organic compounds, for example in the pharmaceutical class, as well as being valuable as intermediate products in the formation of adducts. In addition these compounds are valuable condensation agents i.e. having the property of reacting very vigorously with water, and therefore in the case of reactions wherein water is split off the resulting water can be bound by the aryl sulfonylthionylamides of the present invention.

The compounds of the present invention can in general be used for the same purposes as the thionylamides as set forth in pages 740–744 and particularly page 742 of the text "Methoden der organischen Chemie," vol. II (1958), by Houben-Meyl. For example, they react with primary amines with the exchange of the thionyl group.

As compared to the already known thionylamides the sulfonylthionylamides of the present invention exhibit an enormously increased reactability of the thionyl amino group. This is apparent from the very vigorous decomposition reaction with water which results in the reformation of the sulfonamide and of the $SO_2$. In addition it is apparent from the reaction thereof with alcohols which proceeds in accordance with the following equation:

$$R\text{---}SO_2\text{---}NSO + 2CH_3OH \rightarrow R\text{---}SO_2NH_2 + (CH_3O)_2SO$$

Another use of the aryl sulfonylthionylamides of the present invention is as thionylation agents. Amines, such as aniline, react therewith in dilute solution in the cold very easily and spontaneously to form thionyl amines and sulfonamides. The reaction proceeds as follows:

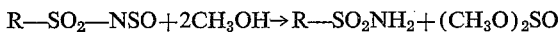
$$R\text{---}SO_2\text{---}NSO + C_6H_5\text{---}NH_2$$
$$\rightarrow R\text{---}SO_2\text{---}NH_2 + C_6H_5\text{---}NSO$$

In the absence of a solvent the above reaction proceeds with extreme violence with extensive decomposition of the products. This reaction provides a method which very nicely results in the production of such thionyl anilines which can only be obtained in very poor yield by reaction of thionyl chloride because of the great amount of side reaction taking place. This reaction proceeds rapidly and quantitatively and clearly shows the greatly increased reactability of the thionyl amino group of these compounds as compared to the thionyl anilines only forms equal amounts of thionyl aniline and aniline and which hydrolyzes much slower and which can be alcoholized completely only with great difficulty.

As in the case of amines the aryl sulfonylthionylamides of the present invention react with sulfenamides and sulfinamides with the formation of the corresponding sulfenylthionylamide and sulfinylthionylamide. The reaction proceeds in accordance with the following equations:

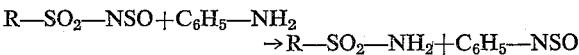
$$RSO_2NSO + R'SNH_2 \rightarrow RSO_2NH_2 + R'SNSO$$
$$RSO_2NSO + R'SONH_2 \rightarrow RSO_2NH_2 + R'SONSO$$

The dienophilic character of the NS-bond of the sulfonylthionylamides is greatly increased in strength as compared to the thionyl anilines. Thus, the aryl sulfonylthionylamides of the present invention react with butadiene and derivatives thereof such as 2,3-dimethylbutadiene without any solvent very vigorously under warming resulting in the corresponding adduct being formed in a very short time and in practically quantitative yield. This is true for example in the case of benzene sulfonylthionylamide, p-toluene sulfonylthionylamide, p-chlorobenzenesulfonylthionylamide, p-bromobenzene sulfonylthionylamide, p-nitrobenzene sulfonylthionylamide, etc. In contrast to the rapid reaction under slight warming, in the case of thionyl aniline it is necessary to react the butadiene therewith by heating under refluxing for 6–8 hours; 1- or 1,4 substituted dienes do not react at all.

The reaction of the aryl sulfonthionylamides of the present invention for example with 2,3-dimethyl butadiene is illustrated in the following equation:

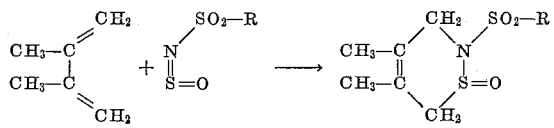

The above reaction is more fully illustrated in the examples wherein the substituent R of the examples is as set forth below:

Example 1: $R = C_6H_5$
Example 2: $R = CH_3\text{---}C_6H_4$
Example 3: $R = C_6H_4Cl$
Example 4: $R = C_6H_4Br$
Example 5: $R = C_6H_4NO_2$ Even under dilution the reaction proceeds quantitatively within three to four hours of warming on a water bath. The resulting adducts are colorless crystalline substances which under infra-red spectrum, as in the case of the adducts of thionyl aniline, exhibit the band of the SO-valence vibration at 1080 cm.$^{-1}$. These new compounds are also valuable as condensation agents.

The following examples will further illustrate the present invention. The scope of the invention is not, however, meant to be limited to the specific details of the examples.

EXAMPLE I

*The Production of Benzene Sulfonylthionylamide:*

$$C_6H_5\text{---}SO_2\text{---}NSO$$

39 g. of dry benzene sulfonamide in 50 cc. of absolute benzene are vigorously cooked under refluxing with an excess of thionyl chloride while excluding moisture. With a slow development of hydrogen chloride the sulfonamide goes very slowly into solution. After 4 days cooking under refluxing the entire mass is dissolved. While still excluding moisture the solvent and excess thionyl chloride are distilled off under vacuum and the brown, syrupy residue, which solidifies upon cooling, is distilled off under vacuum. B.P.$_{0.01}$ = 115–118° C. The benzene sulfonylthionylamide is transformed to a slightly yellowish oil which is collected in the receiver and solidifies to a solid, still yellowish mass. The melting point is 70–71° C. and the yield is 35 g. (70% of the theoretical).

When the starting reaction mixture contains 15 g. of benzene sulfonamide under the same reaction conditions the yield amounts to 15.5 g. (80% of the theoretical), with the reaction time of 2 days.

*Addition of Benzene Sulfonylthionylamide to 2,3-Dimethylbutadiene*

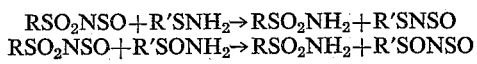

4 g. of dimethylbutadiene are added to 5 g. (0.025 mol) of solid benzene sulfonylthionylamide. A moderate warming occurs and the thionylamide goes slowly into solution. Upon 2 hours of heating on a water bath the reaction goes to completion. Upon cooling the reaction mixture the adduct separates as a solid, slightly yellowish mass. The excess diene is filtered off under suction and the residue contains 7.0 g. of the crude adducts, which corresponds to a quantitative reaction. The resulting adduct is 4,5-dimethyl-3,6-dihydro-2-benzene sulfonyl-2-diazine-1-oxide.

By recrystallization from benzene-petroleum ether (1:1) and carbon tetrachloride the pure adduct is obtained in the form of colorless crystals which melt at 112° C. The infra-red spectrum exhibits besides the bands of the $SO_2$ group the strong SO-band at 1080 cm.$^{-1}$, which is typical for this type of dihydrothiazine oxide compound.

In a similar manner by the addition of 2-chloro butadiene to benzene sulfonylthionylamide the adduct is formed corresponding to 5-chloro-3,6-dihydro-2-benzene-sulfonyl-1,2-thiazine-1-oxide. The melting point is 107–107.5° C.

Similarly, the addition of benzene sulfonylthionylamide to butadiene results in the formation of 3,6-dihydro-2-benzene sulfonyl-1,2-thiazine-1-oxide. The melting point is 190° C.

Reaction of Benzene Sulfonylthionylamide With Aniline 1.8 g. (0.0195) are freshly distilled and water-free aniline in 5 cc. of dry benzene are slowly added dropwise to 4.5 g. (0.022 mol) of benzene sulfonylthionylamide dissolved in 10 cc. of dry benzene. The reaction mixture is filtered from the precipitated sulfonamide under the exclusion of moisture and the benzene is suction filtered under vacuum. The crude product is obtained in an amount of 2.8 g., which after distillation amounts to 2.5 g. of thionylaniline (93% of the theoretical). Under infra-red spectrum the compound by reason of the high layer thickness is found to be free of aniline. In the same manner m-thionylanisidine and p-dimethylamino thionylaniline are produced.

EXAMPLE II

Production of p-Toluene Sulfonylthionylamide:

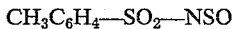

$$CH_3C_6H_4-SO_2-NSO$$

The production proceeds as in the case of benzene sulfonylthionylamide. From 12 g. of p-toluene sulfonamide there is obtained 14.2 g. (93% of the theoretical) of a distilled product. B.P.$_{0.001}$=108–110° C. The melting point is 53° C. and the compound is slightly yellow. The duration of the action is 36 hours.

Addition of p-Toluenesulfonylthionylamide to Dimethylbutadiene 4.2 g. of thionylamide in 5 cc. of benzene are reacted with 2 g. of dimethyl butadiene and the solution is heated for 3 hours on a water bath. The further working up proceeds as in the foregoing example: 5.8 g. of a crude product are obtained, which corresponds to a quantitative reaction. Recrystallization from benzene-petroleum ether results in the pure adduct in the form of colorless crystals having a melting point of 133° C. The adduct is 4,5-dimethyl-3,6-dihydro-2-p-toluene sulfonyl-1,2-thiazine-1-oxide.

The addition of p-toluene sulfonylthionylamide to butadiene results in 3,6-dihydro-2-p-toluene sulfonyl-1,2-thiazine-1-oxide having a melting point of 97–98° C.

The addition of p-toluene-sulfonylthionylamide to 2-chlorobutadiene results in 5-chloro-3,6-dihydro-2-p-toluene sulfonyl-1,2-thiazine-1-oxide having a melting point of 129–130° C.

The adduct formed by the addition of p-toluene-sulfonylthionylamide to cyclohexadiene has a melting point of 131–134° C.

The adduct formed by the addition of p-toluene-sulfonylthionylamide to p-nitrophenyl-butadiene has a melting point of 152–154° C.

The adduct formed by the addition of p-toluene-sulfonylthionylamide to sorbic acid-ethyl ester has a melting point of 95° C.

EXAMPLE III

Production of p-Chlorobenzene Sulfonylthionylamide

The production proceeds as in the previous example. From 23 g. of p-chlorobenzene sulfonamides there are obtained 28 g. of the crude product.

Addition of p-Chlorobenzene Sulfonylthionylamide to Butadiene 28 g. of p-chlorobenzene sulfonylthionylamide in 30 cc. of benzene are reacted with an excess of butadiene in a pressure vessel. The yield of 3,6-dihydro-2-p-chlorobenzene sulfonyl 1,2-thiazine-1-oxide amounts to 26 g. The melting point is 149–151° C. (with decomposition).

EXAMPLE IV

Production of p-Bromobenzenesulfonylthionylamide

The production proceeds as in the case of producing benzene sulfonylthionylamide in Example I. 20 g. of p-bromobenzene sulfonamide are reacted with 12 g. of thionyl chloride in 30 cc. of benzene.

Addition of p-Bromobenzenesulfonylthionylamide to Butadiene 13 g. of p-bromobenzene sulfonylthionylamide are reacted with butadiene as in Example III. The resulting 3,6-dihydro-2-p-bromobenzene sulfonyl-1,2-thiazine-1-oxide melts at 113° C.

The addition of p-bromobenzene sulfonylthionylamide to dimethylbutadiene results in the production of 4,5-dimethyl-3,6-dihydro-2-p-bromobenzene sulfonyl-1,2-thiazine-1-oxide having a melting point of 127–128° C.

EXAMPLE V

Production of p-Nitrobenzene Sulfonylthionylamide

The production proceeds as in the case of producing benzene sulfonylthionylamide by reacting 25 g. of p-nitro benzene sulfonamide with a slight excess of thionyl chloride.

Addition of p-Nitrobenzene Sulfonylthionylamide to Butadiene 25 g. of p-nitrobenzene sulfonylthionylamide are reacted with butadiene as in Example III. The resulting 3,6-dihydro-2-p-nitrobenzene sulfonyl-1,2-thiazine-1-oxide melts at 160–161° C. (with decomposition) from alcohol.

Addition of p-Nitrobenzene Sulfonylthionylamide to Dimethyl Butadiene p-Nitrobenzene sulfonylthionylamide are reacted with dimethylbutadiene as in Example I. The resulting 4,5-dimethyl - 3,6-dihydro-2-p-nitrobenzene sulfonyl-1,2-thiazine-1-oxide melts at 127° C. (from alcohol).

The following example illustrates the oxidation of the adduct produced according to the present invention:

EXAMPLE VI

Oxidation of 3,6-Dihydro-2-p-Toluene Sufonyl-1,2-Thiazine-1-Oxide to 3,6-Dihydro-2-p-Toluene Sulfonyl-1,2-Thiazine-1-Dioxide 3 cc. of 30% hydrogen peroxide are added to 3 g. of 3,6-dihydro-2-p-toluene sulfonyl-1,2-thiazine-1-oxide in 25 cc. of formic acid and the reaction mixture is heated to 70° C. After 3 hours it is mixed with water resulting in a precipitation of 3,6-dihydro-2-p-toluene-sulfonyl-1,2-thiazine-1-dioxide. After recrystallization from alcohol the melting point is 139–140° C. In analogous manner 3,6-dihydro-2-p-nitrobenzene sulfonyl-1,2-diazine-1-oxide is oxidized to 3,6-dihydro-2-p-nitrobenzene-sulfonyl-1,2-diazine-1-dioxide having a melting point of 230–233° C.

The following example illustrates the hydrolysis (which can be either acid or alkaline) of the adducts produced according to the present invention:

EXAMPLE VII 6 g. of 3,6 - dihydro-2-benzene sulfonyl-1,2-thiazine-1-oxide are dissolved in 40 cc. of concentrated hydrochloric acid under moderate warming. Shortly thereafter an oil separates. It is allowed to stand overnight, shaken with chloroform, the chloroform solution is dried with potassium carbonate and de-acidified. The chloroform is then distilled off. There is thus obtained 5.1 g. of crude 3-butenylbenzene sulfonamide. B.P.$_{0.001}$=125° C.; $n_D^{20}$ 1.5410.

In the case of alkaline hydrolization 6 g. of 3,6-dihydro-2-benzene sulfonyl-1,2-thiazine-1-oxide in 45 cc. of water in which 10 g. of sodium hydroxide are dissolved is allowed to stand overnight in the cold. After neutralization with acetic acid to the reaction mixture is acidified with hydrochloric acid resulting in the precipitation of an oil which is identical with the reaction product obtained upon acid hydrolysis.

3,6-dihydro-2-p-toluene sulfonyl-1,2-thiazine-1-oxide is in analogous manner hydrolyzed to 3-butenyl-p-toluene sulfonamide. B.P.$_{0.001}$=128° C.; $n_D^{20}$ 1.5395.

3,6-dihydro-3-p-nitrobenzene sulfonyl-1,2-thiazine-1-oxide is hydrolyzed to 2-butenyl-p-nitrobenzene sulfonamide having a melting point of 77° C.

5 - chloro-3,6-dihydro-2-p-toluene-sulfonyl-1,2-thiazine-1-oxide is hydrolyzed to n-3-chlorobutenyl-3-p-toluene sulfonamide having a melting point of 57° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

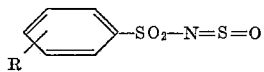

wherein R is selected from the group consisting of hydrogen, lower alkyl, halogen and nitro.
2. Benzene sulfonylthionylamide.
3. p-Toluene sulfonylthionylamide.
4. p-Chlorobenzene sulfonylthionylamide.
5. p-Bromobenzene sulfonylthionylamide.
6. p-Nitrobenzene sulfonylthionylamide.
7. A compound of the formula:

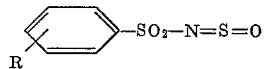

wherein R is lower alkyl.

8. A compound of the formula:

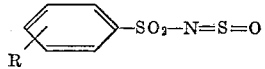

wherein R is halogen.

References Cited in the file of this patent
UNITED STATES PATENTS

| | | |
|---|---|---|
| 2,732,401 | De La Mater | Jan. 24, 1956 |
| 2,867,658 | Frick | Jan. 6, 1959 |
| 2,937,202 | Slagh et al. | May 17, 1960 |
| 2,946,815 | Hamer | July 26, 1960 |
| 2,948,753 | Kranz | Aug. 9, 1960 |
| 2,963,476 | de Stevens | Dec. 6, 1960 |
| 2,978,448 | Hasspacher | Apr. 4, 1961 |

OTHER REFERENCES

Houben-Weyl: "Methoden der organischen Chemie," vol. XI/2, pages 738–739 (1958).

Houben-Weyl: "Methoden der organischen Chemie," vol. XI/2, pages 739–744 (1958).